United States Patent
Li et al.

(10) Patent No.: US 8,476,867 B2
(45) Date of Patent: Jul. 2, 2013

(54) ROBOT BATTERY CHARGING STATION

(75) Inventors: Xiong Li, Shenzhen (CN); Kim-Yeung Sip, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/300,676

(22) Filed: Nov. 21, 2011

(65) Prior Publication Data
US 2012/0062170 A1    Mar. 15, 2012

Related U.S. Application Data

(62) Division of application No. 12/264,917, filed on Nov. 5, 2008, now Pat. No. 8,106,626.

(30) Foreign Application Priority Data
Jun. 19, 2008    (CN) .......................... 2008 1 0302207

(51) Int. Cl.
*H02J 7/00*    (2006.01)

(52) U.S. Cl.
USPC .......................................... 320/109; 320/115

(58) Field of Classification Search
USPC .......................................................... 320/109
See application file for complete search history.

(56) References Cited

U.S. PATENT DOCUMENTS

2007/0216347 A1*    9/2007    Kaneko et al. ................ 320/107
2008/0004751 A1*    1/2008    Chung et al. .................. 700/258

* cited by examiner

*Primary Examiner* — Arun Williams
(74) *Attorney, Agent, or Firm* — Altis Law Group, Inc.

(57) ABSTRACT

A battery charging station, for a robot, includes a base, two side-walls barriers, a stop, a supporting arm, a charging connector, and a transmitter. The side-walls barriers are separately mounted on the base. The stop is mounted on the back of the base to form a docking space together with the barriers and the base. The supporting arm is mounted on the stop by one free end thereof with the other end extending into the space over the docking space. The charging connector is mounted on the free end of the supporting arm and is configured for providing an electrical connection between the robot and a power source. The transmitter is positioned on the upper surface of the supporting arm and is configured for emitting signals for the robot to locate the re battery charging station.

18 Claims, 6 Drawing Sheets

ROBOT BATTERY CHARGING STATION

CROSS-REFERENCE TO RELATED APPLICATION

The present application is a divisional application of and claims priority to U.S. patent application Ser. No. 12/264,917, entitled "ROBOT FOR USE WITH ROBOT BATTERY CHARGING STATION" and filed on 2008 Nov. 5, now U.S. Pat. No. 8,106,626 which is incorporated herein by reference.

BACKGROUND

1. Technical Field

The present disclosure relates to charging stations, and particularly, to a robot battery charging station.

2. Description of Related Art

Autonomous machines and devices, such as autonomous robots, have been designed for performing various industrial and domestic functions. These domestic functions include lawn mowing, vacuum cleaning, floor sweeping and general maintenance.

Autonomous robots typically operate in accordance with various computer programs that are part of the operating system of the robots. Additionally, many of these autonomous robots are battery powered, and need to be recharged once they are out of battery power. Additionally, when out of battery power, these autonomous robots are immobilized where the power ran out and may be troublesome to locate or reach.

As a result, the autonomous robots must be located and manually brought to the charging unit, which is typically an electrical outlet. This process is time-consuming, in addition to the time spent waiting for the robot to fully recharge.

Therefore, it is desired to design a robots battery charging stations and robots for use therewith which are capable of charging automatically when out of battery power.

BRIEF DESCRIPTION OF THE DRAWINGS

The components in the drawings are not necessarily drawn to scale, the emphasis instead being placed upon clearly illustrating the principles of robot battery charging station. Moreover, in the drawings, like reference numerals designate corresponding sections throughout the several views.

DETAILED DESCRIPTION

Figure 1:
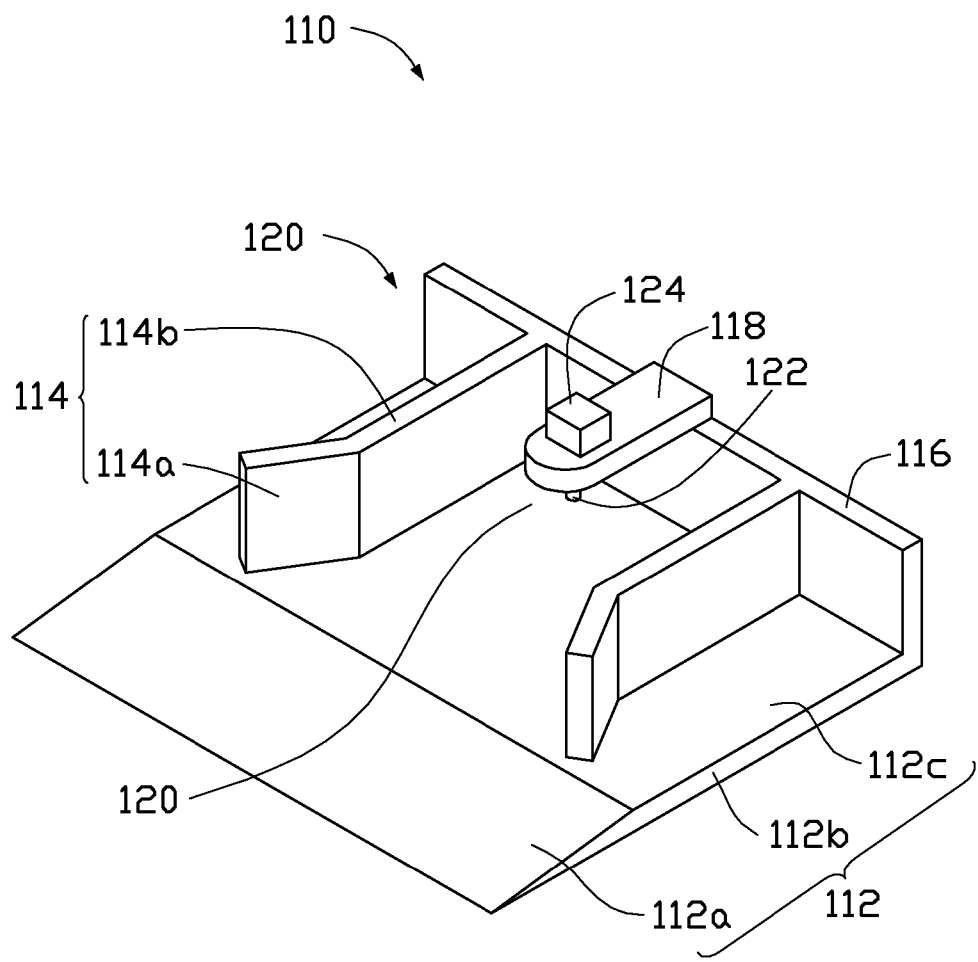
FIG. 1 is a schematic view of a battery charging station according to an exemplary embodiment.

Referring to FIG. 1, a battery charging station 110 for receiving a robot or a suitable autonomous machine to charge in accordance with one embodiment of the disclosure is shown. The battery charging station 110 includes a base 112, two barriers 114, a stop 116 and a supporting arm 118. The base 112, the barriers 114, the stop 116 and the supporting arm 118 are typically made from plastic material and joined by mechanical techniques or chemical fasteners.

The base 112 includes an inclined portion 112a and a docking portion 112b joined with the inclined portion 112a. The docking portion 112b defines a flat surface 112c for docking the robot. The inclined portion 112a is configured for allowing the robot to easily climb to the docking portion 112b for charging, when low on battery power.

The barriers 114 are configured for guiding the robot to the correct position when docking. The barriers 114 are separately mounted on docking portion 112b of the base 112 and together with the inclined portion 112a to form a passage for the robot. Each barrier 114 includes a guiding portion 114a and a locating portion 114b connected on an end of the guiding portion 114a. The guiding portions 114a are inclined with respect to and facing away from the corresponding connected locating portion 114b.

The stop 116 is configured for preventing the robot from travelling beyond the battery charging station during docking. The stop 116 is mounted on the docking portion 112b of the base 112, against the barriers 114, but away from the inclined portion of the base 112. The base 112, the barriers 114 and the stop 116 collectively form a docking space 120 for receiving the robot.

The supporting arm 118 is mounted on an upper portion of the stop 116 by one end thereof. The other end of the supporting arm 118 protrudes above the docking space 120 and is configured for supporting a charging connector 122 thereon for supplying power to the robot when charging. The distance between the charging connector 122 with respect to the stop 116 is equal to that of the charging connector 122 with respect to each locating portion 114b of the barriers 114. The charging connector 122 may be connected to an external power source, such as an electrical outlet, via cord or other connection medium.

In addition, the battery charging station 110 further includes a transmitter 124 located on the supporting arm 118 and is configured for emitting identifiable signals, for the robot to determine the location of the battery charging station 110, and for the robot to navigate along a predefined path into the battery charging station 110. The signals may be a radio signal, a light signal, or any other signal whose intensity is greatest when closest to its transmission source.

Figure 2:
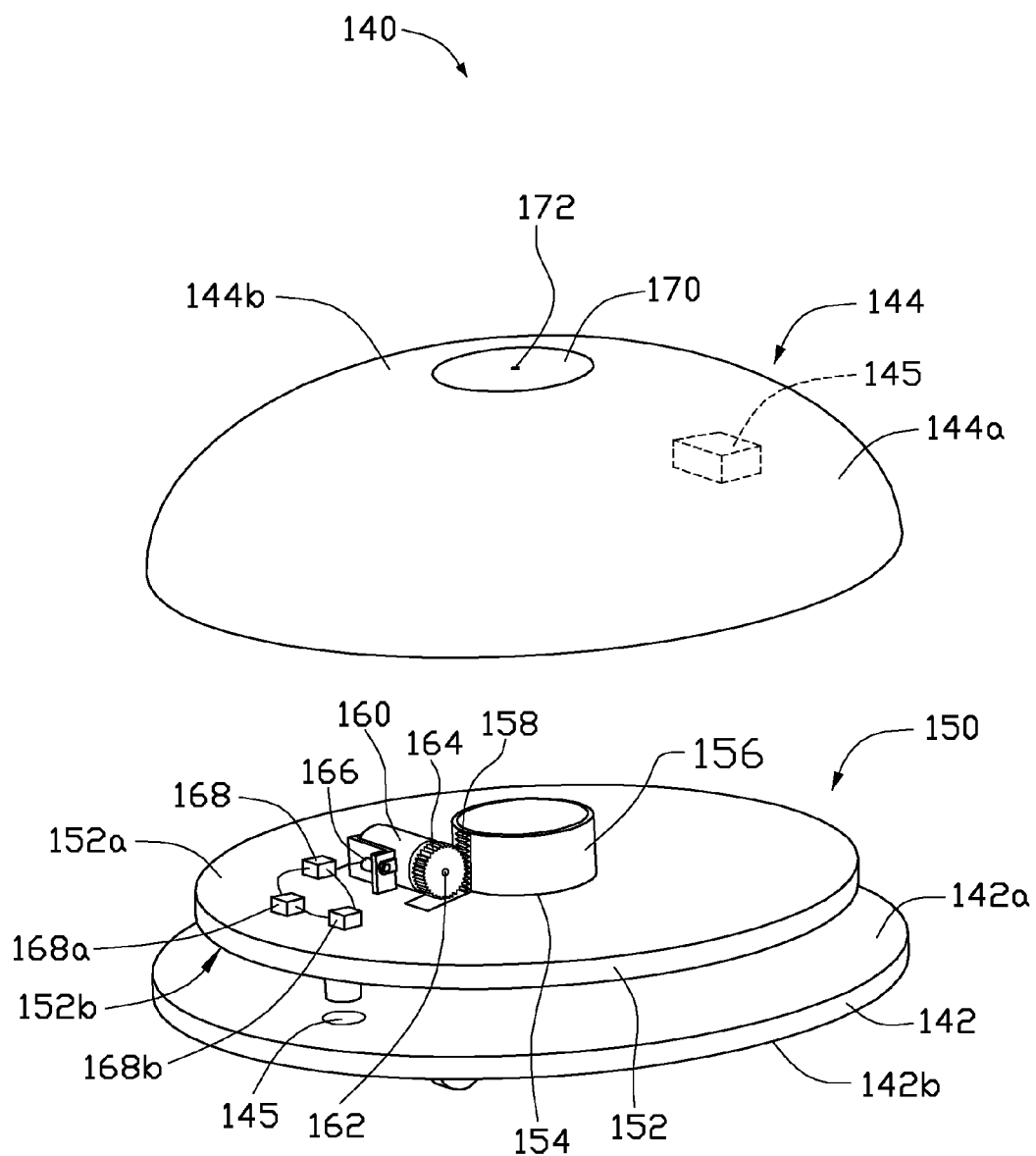
FIG. 2 is a schematic exploded view of a robot according to an exemplary embodiment.
Figure 3:
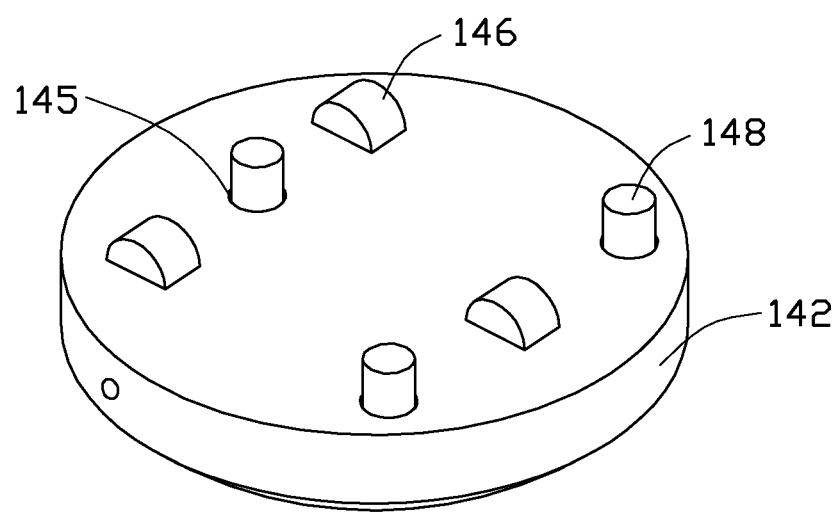
FIG. 3 is a schematic bottom view of the robot of FIG. 2.

Referring to FIGS. 2 and 3, the robot 140 includes a round-shaped chassis 142 and a hemispherical shell 144 positioned over the chassis 142 and covering the chassis 142. The center of the shell 144 is aligned with the center of the chassis 142 and the diameter of the shell is equal to or less than that of the chassis. The radius of the chassis 142 is equal to the distances of the charging connector 122 with respect to both the barriers 114 and the stop 116. As a result, when the robot 140 is docked in the docking space 120 against the barriers 114 and the stop 116, the charging connector 122 battery charging station aligns with the center portion of the shell 144 and electrically couples to the charging elements in the center portion of the shell 144, thus enabling an electrical connection between the robot 140 and the battery charging station 110.

The chassis 142 includes an upper surface 142a and a lower surface 142b on the flip side of the upper surface 142a. Three wheels 146 are rotatably mounted on the lower surface 142b and can be driven by a driving motor (not shown) to drive the robot to move. The chassis 142 also includes three extendable legs 148 which can be extended for lifting the robot 140 to electrically connect the robot 140 to the battery charging station 110 for charging. The length of the legs 148 with respect to the lower surface 142b of the chassis 142 is longer than that of the wheels 146 when the legs 148 are extended. The extendable legs 148 may be any other types of extensible structure which can be adjusted in length, such as telescopic or folding legs. The legs 148 are capable of extending automatically via the driving motors (not shown in the figures). In the present embodiment, an extending device 150 carries out the automatic expansion of the legs 148.

The extending device 150 includes a substrate 152, a driven portion 156 and a driving motor 160. The substrate 152 includes a first surface 152a and a second surface 152b corresponding to the first surface 152a. The substrate 152 defines a through hole 154 on the center portion thereof and is stacked on the upper surface 142a of the chassis 142 via the second surface 152b. The driven portion 156 is formed on the upper surface 142a and protrudes out from the substrate 152 by running through the through hole 154 of the substrate 152. A toothed bar 158 is formed on the side wall of the driven portion 156 along a direction parallel to the axis of the driven portion 156. The driving motor 160 is mounted on the first surface 152a of the substrate 152 and has a shaft 162 and a gear 164 connected to an end of the shaft 162. The gear 164 of the driving motor 160 is engaged with the toothed bar 158. The legs 148 are separately mounted on the second surface 152b of the substrate 152 and partially extends through the chassis 142 from the corresponding hole 145 defined on the chassis 142. When the gear 164 is rotated by the shaft 162 of the driving motor 160, the driven portion 156 can move upwards or downwards with respect to the gear 164. Accordingly, the chassis 142 connected with the driven portion 156 moves following the movement of the driven portion 156. As a result, the legs 148 can extend or retract from chassis 142 and lifts or lowers the chassis 142 of the robot 140. As such, the robot 140 can automatically establish an electrical connection with the charging connector 122 of the battery charging station 110 for charging.

In addition, the robot 140 also includes a detection sensor 166 and a control device 168, both of which are attached on the first surface 152a of the substrate 152. The control device 168 is configured for controlling the robot 140 to charge automatically when the power of the robot drops to a predefined level. The detection sensor 166 is configured for detecting and receiving the signals emitted from the transmitter 124, subsequently transmitting those signals to the control device 168 for further processing. The control device 168 is configured for receiving the signals detected by the detection sensor 166 and determining the location of the robot 140 with respect to the battery charging station 110 according to the signals, subsequently driving the robot 140 to move towards the battery charging station 110 by traveling along a predefined traveling trace, and controlling the legs to elongate and uplift the robot 140 for charging power. Alternatively, a navigation system 168a and a drive system 168b can be coordinated in the control device 168 to move the robot 140 into the battery charging station 110.

The shell 144 is mounted over the upper surface 142a of the chassis 142 and covers those elements mounted on the upper surface 142a of the chassis 142 between the shell 144 and the chassis 142. The shell 144 includes an outer surface 144a and an inner surface (not shown). The charging elements, such as electrical conductive charging pads 170, are disposed on the dome point 144b on the outer surface 144a of the shell 144. An electrode 172 is formed on the center portion of the charging pad 170 in isolation. The charging pad 170 and the electrode 172 are configured for charging a power source (not shown) of the robot 140 when the charging pad 170 and the electrode 172 are collectively and electrically coupled to the charging connector 122. The power source is mounted on the inner surface of the shell 114 and electronically connected to those driving motors adopted in the robot 140 through the control device 168 for supplying power to the robot 140. In addition, the power source is electrically coupled to the charging pad 170 and the electrode 172 and can be recharged by the battery charging station 110. Alternatively, the robot 140 can also include a voltage sensor 145 mounted on the inner surface of the shell 144 that is electrically coupled to the power source and the control device 168. The voltage sensor 145 is configured for detecting the voltage of the power source and sending the detected signal to the control device 168 when the voltage of the power source is below a predetermined voltage or the power source has been fully recharged.

The robot 140 can also be programmed to dock to the battery charging station 110 for charging when: 1) its operation has been complete (the operation is predefined); 2) its battery voltage reaches or drops to a predetermined threshold; or 3) a predetermined time for operation has expired.

Figure 4:
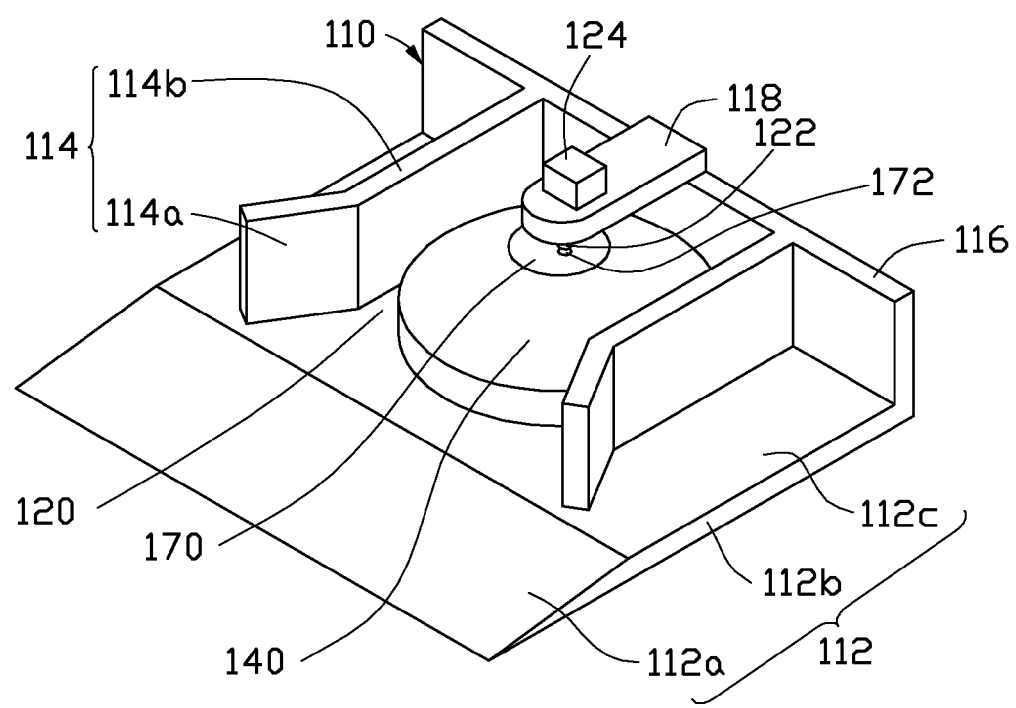
FIG. 4 is a schematic view of charging the robot of FIG. 2.
Figure 5:
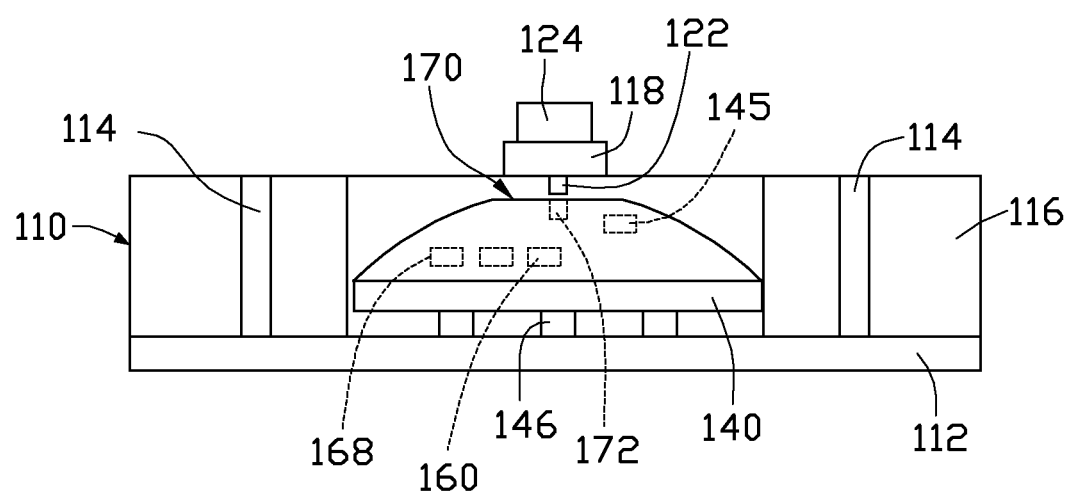
FIGS. 5-6 are schematic views detailing movement of the robot during charging.
Figure 6:
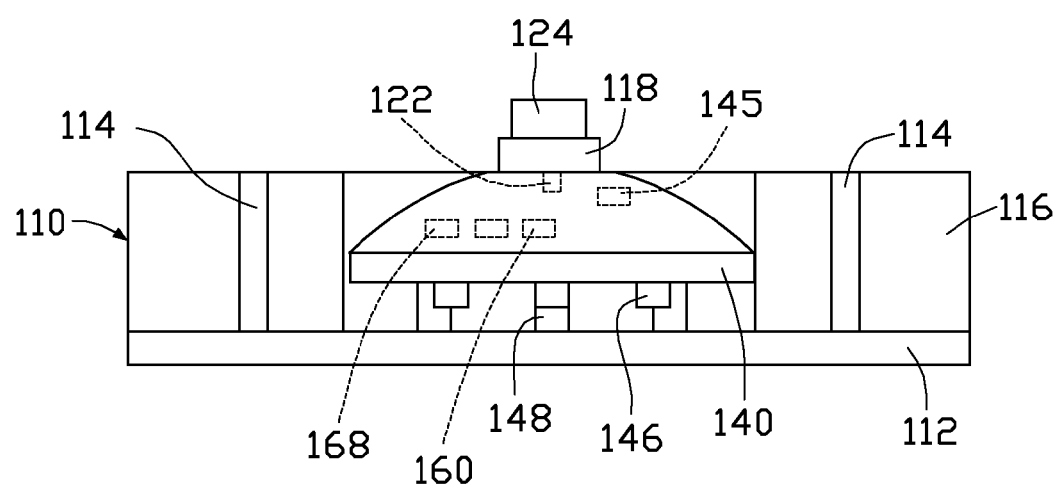

An exemplary charging operation of the robot 140 will now be described by referring to FIGS. 4-6, with references to FIGS. 1-3 where appropriate. The control device 168 drives the robot 140 to move towards the battery charging station 110 along a predetermined path when the robot need to dock. The robot 140 climbs on the inclined portion 112a and then arrives to the docking portion 112b of the base 112 along the barriers 114. When the chassis 142 of the robot 142 touches the stop 116 of the battery charging station 110, the robot 140 stops moving and is received in the docking space 120, and the charging pad 170 and the electrode 172 of the robot 140 are aligned with the charging connector 122. The extendable legs 148 are extended by the driving motor 160 to lift the robot 140, and the charging pad 170 and the electrode 172 are raised following the lifting of the robot 140. When the charging pad 170 and the electrode 172 are electrically coupled to the charging connector 122, the driving motor 160 stops, and the robot 140 is recharged by the battery charging station 110. When the voltage sensor 145 detects that the power source of the robot 140 has been fully recharged, the voltage sensor 145 sends a signal to the control device 168 indicating the power source of the robot 140 has been fully recharged. Next, the control device 168 controls the legs 148 to retract to their original state by the driving motor 160. Finally, the fully recharged robot 140 can be set to resume operation from the battery charging station 110, typically by the control device 168, the navigation system 168a, and the drive system 168b.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A battery charging station comprising:
   a base;
   two barriers separately mounted on the base;
   a stop mounted on the base against the barriers to form a docking space together with the barriers and the base for receiving a robot to be recharged therein;
   a supporting arm mounted on the stop by one free end thereof with the other end extending into the space over the docking space;
   a charging connector mounted on the free end of the supporting arm and configured for providing electrical connection between the robot and a power source; and
   a transmitter positioned on the upper surface of the supporting arm, the transmitter configured for emitting signals to the robot to determine the location thereof with respect to the battery charging station to navigate the robot to move along a predetermined path and dock into the docking space of the battery charging station for recharging.

2. The battery charging station as claimed in claim 1, wherein the base comprises an inclined portion and a docking portion joined with the inclined portion.

3. The battery charging station as claimed in claim 2, wherein the inclined portion is configured for allowing the robot to climb up to the docking portion for charging.

4. The battery charging station as claimed in claim 2, wherein the docking portion comprises a flat surface for docking the robot and the barriers and the stop are mounted on the flat surface.

5. The battery charging station as claimed in claim 2, wherein the barriers are configured for guiding the robot to the correct position when docking.

6. The battery charging station as claimed in claim 2, wherein each of the two barriers comprises a guiding portion and a locating portion connected on an end of the guiding portion, the guiding portions of the barriers are inclined with respect to and facing away from the corresponding connected locating portion.

7. The battery charging station as claimed in claim 6, wherein the stop is against the barriers and away from the guiding portion of the barriers and the inclined portion of the base, and is configured for preventing the robot from travelling beyond the battery charging station during docking.

8. The battery charging station as claimed in claim 1, wherein the distances between the charging connector with respect to the stop and each fence are equal.

9. The battery charging station as claimed in claim 1, wherein the base, the two barriers, the stop and the supporting arm are made from plastic material.

10. The battery charging station as claimed in claim 1, wherein the signals are selected from the group consisting of a radio signal, and a light signal.

11. A battery charging station for a robot, comprising:
  a base comprising an inclined portion and a docking portion joined with the inclined portion;
  two barriers separately mounted on the docking portion of the base and together with the inclined portion to form a passage for the robot;
  a stop mounted on the base against the barriers to form a docking space together with the barriers and the base for receiving the robot to be recharged therein;
  a supporting arm mounted on the stop by one free end thereof with the other end extending into the space over the docking space;
  a charging connector mounted on the free end of the supporting arm and configured for providing electrical connection between the robot and a power source; and
  a transmitter positioned on the upper surface of the supporting arm, the transmitter configured for emitting signals to the robot to determine the location thereof with respect to the battery charging station and to navigate the robot to move along a predetermined path and the passage and dock into the docking space of the battery charging station for recharging.

12. The battery charging station as claimed in claim 11, wherein the inclined portion is configured for allowing the robot to climb up to the docking portion for charging.

13. The battery charging station as claimed in claim 11, wherein the docking portion comprises a flat surface for docking the robot and the barriers and the stop are mounted on the flat surface.

14. The battery charging station as claimed in claim 11, wherein each of the two barriers comprises a guiding portion and a locating portion connected on an end of the guiding portion, the guiding portions of the barriers are inclined with respect to and facing away from the corresponding connected locating portion.

15. The battery charging station as claimed in claim 11, wherein the stop is against the barriers and away from the guiding portion of the barriers and the inclined portion of the base, and is configured for preventing the robot from travelling beyond the battery charging station during docking.

16. The battery charging station as claimed in claim 11, wherein the distances between the charging connector with respect to the stop and each fence are equal.

17. The battery charging station as claimed in claim 11, wherein the base, the two barriers, the stop and the supporting arm are made from plastic material.

18. The battery charging station as claimed in claim 11, wherein the signals are selected from the group consisting of radio signals, and light signals.

* * * * *